United States Patent
Koo et al.

(10) Patent No.: US 10,163,595 B2
(45) Date of Patent: Dec. 25, 2018

(54) GASKET, MAGNETIC SWITCH OF STARTER COMPRISING SAME, AND STARTER PROVIDED WITH MAGNETIC SWITCH

(71) Applicant: VALEO ELECTRICAL SYSTEMS KOREA LTD., Gyeongju-si, Gyeongsangbuk-do (KR)

(72) Inventors: Jin Keun Koo, Gyeongju-si (KR); Sang Hyun Ha, Gyeongju-si (KR); Byung Woo Kim, Gyeongju-si (KR); Kwang Sik Woo, Ulsan (KR); Jong In Lee, Gyeongju-si (KR); Ji Kon Kim, Pohang-si (KR)

(73) Assignee: Valeo Electrical Systems Korea Ltd., Gyeongju-si, Gyeongsangbuk-do (KR)

( * ) Notice: Subject to any disclaimer, the term of this patent is extended or adjusted under 35 U.S.C. 154(b) by 0 days.

(21) Appl. No.: 15/100,195

(22) PCT Filed: Nov. 14, 2014

(86) PCT No.: PCT/KR2014/010958
§ 371 (c)(1),
(2) Date: May 27, 2016

(87) PCT Pub. No.: WO2015/088151
PCT Pub. Date: Jun. 18, 2015

(65) Prior Publication Data
US 2016/0379783 A1    Dec. 29, 2016

(30) Foreign Application Priority Data
Dec. 12, 2013 (KR) .................. 10-2013-0154454

(51) Int. Cl.
*F16J 15/36* (2006.01)
*H01H 50/02* (2006.01)
(Continued)

(52) U.S. Cl.
CPC ......... *H01H 50/023* (2013.01); *F02N 11/087* (2013.01); *F02N 15/006* (2013.01);
(Continued)

(58) Field of Classification Search
CPC .... H01H 50/023; H01H 50/00; F02N 11/087; F02N 11/00; F02N 15/067; F02N 15/00; F16N 2250/08; F16J 15/36; F16J 15/363
See application file for complete search history.

(56) References Cited

U.S. PATENT DOCUMENTS 4,275,890 A * 6/1981 Reinsma ............ B62D 55/0887
                                                      277/384
5,181,002 A    1/1993 Sugiyama
(Continued)

FOREIGN PATENT DOCUMENTS

CN    101354002    1/2009
CN    102060054    5/2011
(Continued)

OTHER PUBLICATIONS

Office Action dated Jul. 4, 2017 for Japanese Patent Application No. 2016-557850 and its English machine translation from Global Dossier.
(Continued)

*Primary Examiner* — Gilbert Y Lee
(74) *Attorney, Agent, or Firm* — Ladas & Parry, LLP (57) ABSTRACT

The present invention relates to a gasket, a magnetic switch of a starter including the same, and a starter including the magnetic switch, the gasket including: a membrane which carries out a sealing function and is made of a resin material having flexibility; and a membrane washer provided along the edge of the membrane in order to prevent bending of the membrane, wherein the membrane and the membrane washer are insert injected. Unlike prior art, the present
(Continued)

invention can enhance the durability of the membrane by insert injection molding a hard membrane washer into the membrane having flexibility, can enhance a waterproofing performance by enabling the membrane to be firmly fixed to a plunger, and can enhance an assembly performance by enabling assembly through an automatic production line.

4 Claims, 5 Drawing Sheets

(51) Int. Cl.
  *F02N 11/08* (2006.01)
  *F02N 15/00* (2006.01)
  *F02N 15/06* (2006.01)
  *F02N 11/00* (2006.01)

(52) U.S. Cl.
  CPC ............ *F02N 15/067* (2013.01); *F02N 11/00* (2013.01); *F02N 15/00* (2013.01); *F02N 2250/08* (2013.01); *F16J 15/363* (2013.01)

(56) References Cited

U.S. PATENT DOCUMENTS

| | | | | |
|---|---|---|---|---|
| 6,776,421 B2* | 8/2004 | Florence | ................ | F16L 39/00 277/602 |
| 2002/0026915 A1* | 3/2002 | Maeyama | ............. | F01L 1/3442 123/90.17 |
| 2008/0047306 A1* | 2/2008 | Dahlheimer | ......... | F16J 15/3472 68/5 E |

FOREIGN PATENT DOCUMENTS

| | | |
|---|---|---|
| CN | 202971904 | 6/2013 |
| DE | 10 2008 043 191 | 4/2010 |
| EP | 0 525 410 | 2/1993 |
| EP | 3 021 343 | 5/2016 |
| JP | 5-6564 | 1/1993 |
| JP | 2005-174590 A | 6/2005 |
| KR | 10-1111546 B1 | 2/2012 |
| KR | 10-1330050 | 11/2013 |

OTHER PUBLICATIONS

Extended European Search Report dated Jun. 23, 2017 for European Patent Application No. 14869199.1.
Office Action dated Jun. 14, 2017 for Chinese Patent Application No. 201480065174.4 and its English provided by Applicant's foreign council.
ISA/KR, International Search Report dated Feb. 6, 2015 in International Application No. PCT/KR2014/010958, total 4 pages including translation.

* cited by examiner

GASKET, MAGNETIC SWITCH OF STARTER COMPRISING SAME, AND STARTER PROVIDED WITH MAGNETIC SWITCH

This application is the U.S. National Phase of International Application No. PCT/KR2014/010958 filed on Nov. 14, 2014, and claims priority under 35 U.S.C. § 119 to Korean Patent Application No. 10-2013-0154454, filed on Dec. 12, 2013, which are hereby expressly incorporated by reference in their entirety for all purposes.

TECHNICAL FIELD

The present invention relates to a starter for a vehicle, and more particularly, to a gasket that can enhance the durability of a membrane by insert injection molding a hard membrane washer into the membrane having flexibility, can enhance a waterproofing performance by enabling the membrane to be firmly fixed to a plunger, and can enhance an assembly performance by enabling assembly through an automatic production line, to a magnetic switch of a starter including the gasket, and to a starter including the magnetic switch.

BACKGROUND OF THE DISCLOSURE

In general, since a car engine cannot start on its own, a crankshaft has to be turned by an external force to rotate the engine by causing an initial explosive combustion in a cylinder. A starting device is used to turn the crankshaft of the engine. Such a starting device includes a starter that generates a torque for cranking of the engine and a battery used to supply driving power to the starter. The starter includes a magnetic switch unit, an armature assembly, an overrunning clutch (ORC) for transferring a driving force of the armature assembly to the crankshaft of the engine and an armature assembly, a gear assembly for torque conversion by reductions of speeds of the revolution per minute (RPM) of a rotating armature and an ORC that is gear-coupled to ring gears of the engine and transfers power to the starter.

The above-described technical configuration is a background art for helping understanding of the present invention and does not indicate a well-known conventional art in the art to which the present invention belongs. The starter is disclosed in Korean Patent Registration No. 10-1111546.

In a conventional starter, a problem is that a gap may be formed due to a deformation of a membrane provided to seal a gap between a case and a plunger that makes reciprocating motions relative to the case. Thus, an improvement is needed for the problem.

The present invention is directed to providing a gasket that can enhance the durability of a membrane by insert injection molding a hard membrane washer into the membrane having flexibility, to a magnetic switch of a starter including the gasket, and to a starter including the magnetic switch.

The present invention is also directed to providing a gasket that can enhance a sealing ability and a waterproofing performance by enabling a bellows of a membrane to be firmly fixed to a plunger by inserting the bellows of the membrane into the plunger and can enhance an assembly performance by enabling assembly through an automatic production line, to a magnetic switch of a starter including the gasket, and to a starter including the magnetic switch.

One aspect of the present invention provides a gasket of a starter for starting an engine of a vehicle, the gasket including: a membrane which carries out a sealing function and is made of a resin material having flexibility; and a membrane washer provided along an edge of the membrane in order to prevent bending of the membrane, wherein the membrane and the membrane washer may be insert injected. Thus, the number of components of the gasket is reduced, and the membrane is hardened so that durability is enhanced.

The membrane may include: a rim member supported at the membrane washer; and a bellows provided inside of the rim member and formed to be wrinkled. Thus, the membrane may harden only the rim member so that a soft state of the bellows may be maintained. The membrane may be formed to expose the membrane washer at one side and may form support ribs to prevent separation of the membrane washer at one side.

Thus, the membrane washer is exposed at one side of the membrane so that an increase in the thickness of the rim member of the membrane may be minimized, and the position of exposure of the membrane washer may be fixed using support ribs. The membrane washer may form bent ribs so as to prevent from being separated from the membrane. The membrane washer forms the bent ribs so that the injected membrane is united with the bent ribs and is prevented from being arbitrarily separated from the membrane washer.

The membrane washer may form accommodation hole portions that accommodate a part of the membrane to prevent being separated from the membrane. The membrane washer forms the accommodation hole portions so that the injected membrane is filled in the accommodation hole portions and is united therewith and thus is prevented from being arbitrarily separated from the membrane washer.

Another aspect of the present invention provides a magnetic switch of a starter for starting an engine of a vehicle, the magnetic switch including: a case; a plunger provided to make reciprocating motions along an axial direction of the case; a gasket that seals a gap between the case and the plunger; and a fixing unit that prevents the gasket supported at the case from escaping in an axial direction of the plunger. Thus, the gasket may be easily assembled to be fixed to the plunger by the fixing unit.

The gasket may include: a membrane which carries out a sealing function for sealing a gap between the case and the plunger, is made of a resin material having flexibility, and forms an insertion hole for inserting the plunger; and a membrane washer provided along the edge of the membrane to prevent bending of the membrane, and the membrane and the membrane washer may be insert injected. Thus, the number of components of the gasket is reduced, and the membrane is hardened so that durability is enhanced.

The fixing unit may include: a fit groove portion formed on a perimeter surface of the plunger; and a fit protrusion protruding along inside of the membrane and inserted into the fit groove portion. As the fixing unit includes the fit groove portion and the fit protrusion, the membrane is simply inserted into the plunger and is naturally fixed and mounted.

Another aspect of the present invention provides a starter for starting an engine of a vehicle, the starter including: a front bracket; and a magnetic switch in which a case enables the front bracket for accommodating the gasket to be separably coupled, wherein a deformation of the gasket may be prevented by a deformation prevention unit. When the front bracket is assembled with the case, a deformation of the gasket is prevented by a deformation prevention unit.

The deformation prevention unit may include: a position setting protrusion extending from an edge of the gasket; and a position setting groove portion formed in the front bracket to accommodate the position setting protrusion. While the position setting groove portion accommodates the position setting protrusion, the front bracket is assembled with the case so that a deformation of the gasket is prevented.

As described above, a gasket, a magnetic switch of a starter including the gasket, and a starter including the magnetic switch can enhance the durability of a membrane by insert injection molding a hard membrane washer into the membrane having flexibility, unlike in the conventional art.

Furthermore, the present invention can enhance a sealing ability and a waterproofing performance by enabling a bellows of the membrane to be firmly fixed to a plunger by inserting the bellows of the membrane into the plunger and can enhance an assembly performance through an automatic production line.

BRIEF DESCRIPTION OF THE DRAWINGS

The present disclosure is described in conjunction with the appended figures.

DETAILED DESCRIPTION OF THE INVENTION

Hereinafter, a gasket, a magnetic switch of a starter including the gasket, and a starter including the magnetic switch according to exemplary embodiments of the present invention will be described with reference to the attached drawings. In this process, thicknesses of lines or sizes of elements shown in the drawings may be exaggerated for clarity and convenience of explanation. Also, as the terms that will be described later have been defined with considerations given to functions in the present invention, they may be changed according to a user, an operator's intention, or practice. Therefore, definitions of the terms should be made based on the content of the present specification throughout.

Figure 1:
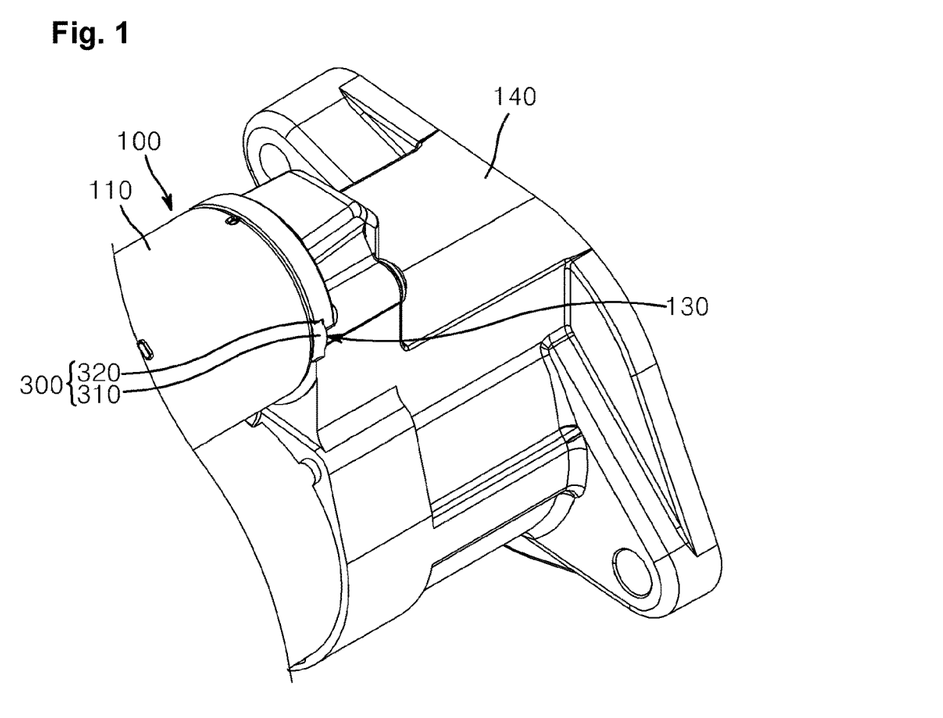
FIG. 1 is a perspective view of a principal portion of a magnetic switch of a starter according to an embodiment of the present invention.
Figure 2:
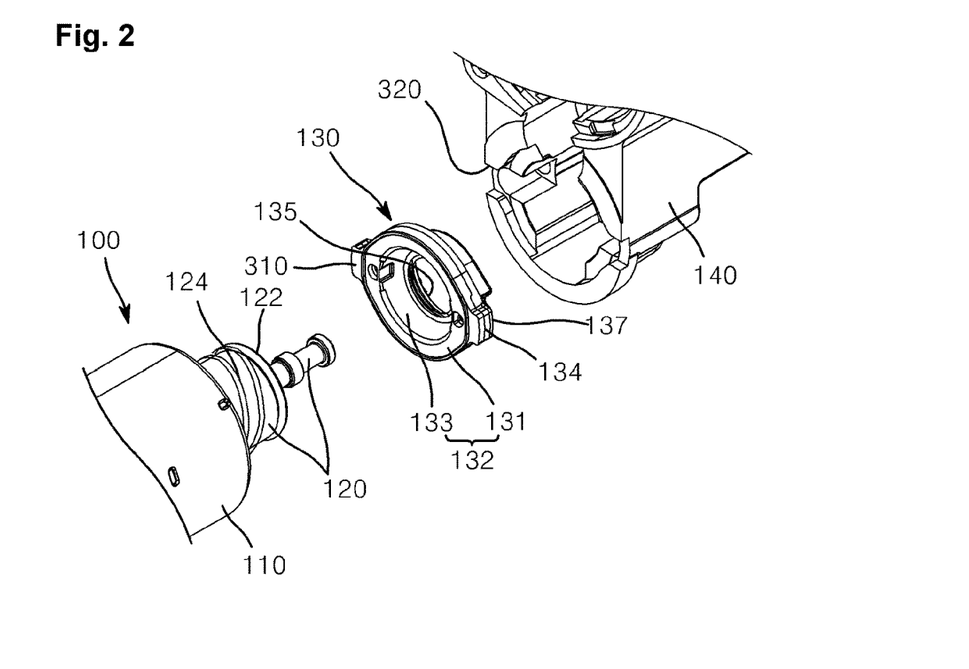
FIG. 2 is an exploded perspective view of a principal portion of the magnetic switch of the starter according to an embodiment of the present invention.
Figure 3:
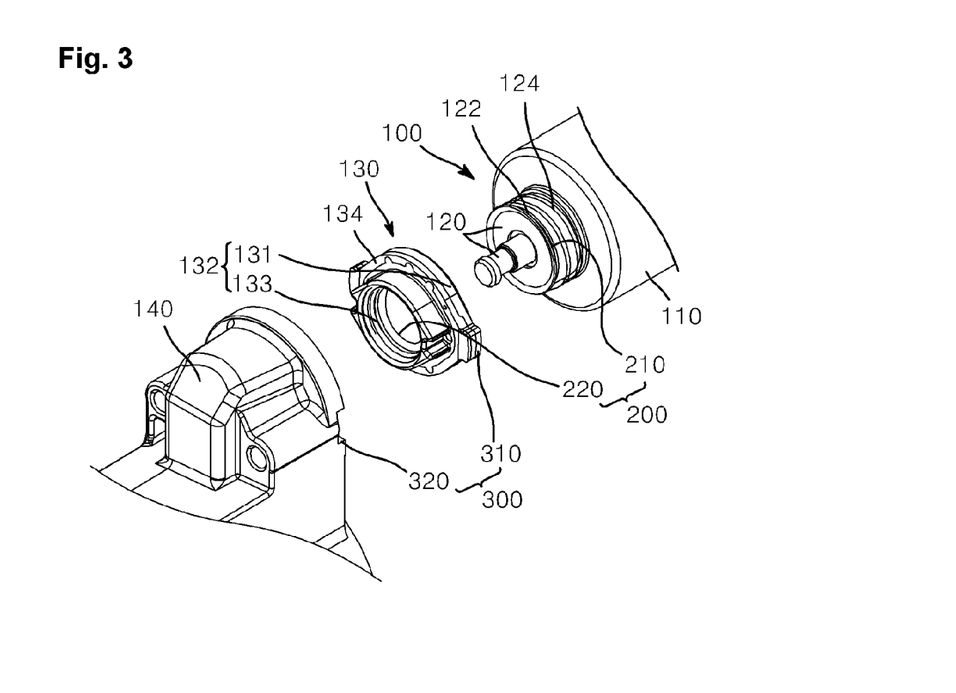
FIG. 3 is an exploded perspective view of the rear of a principal portion of the magnetic switch of the starter according to an embodiment of the present invention.

FIG. 1 is a perspective view of a principal portion of a magnetic switch of a starter according to an embodiment of the present invention, FIG. 2 is an exploded perspective view of a principal portion of the magnetic switch of the starter according to an embodiment of the present invention, and FIG. 3 is an exploded perspective view of the rear of a principal portion of the magnetic switch of the starter according to an embodiment of the present invention.

Figure 4:
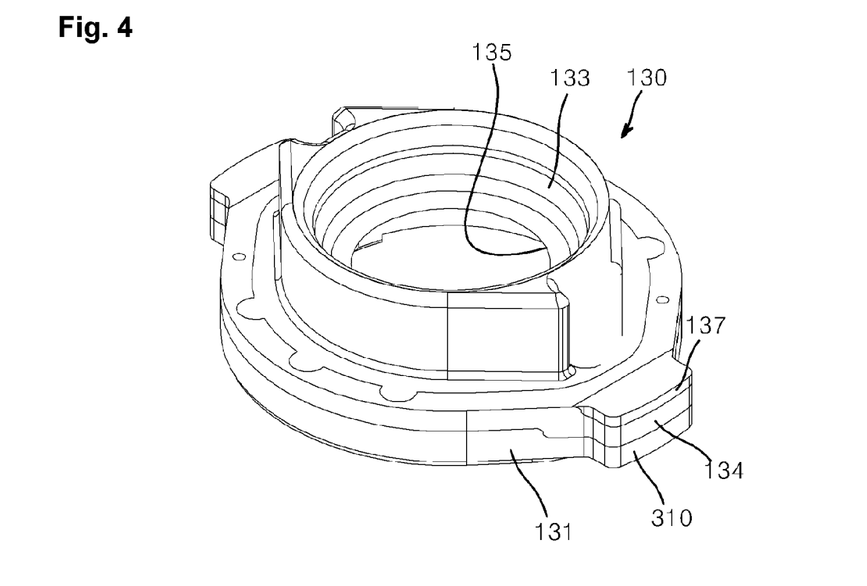
FIG. 4 is an enlarged perspective view of a gasket according to an embodiment of the present invention.
Figure 5:
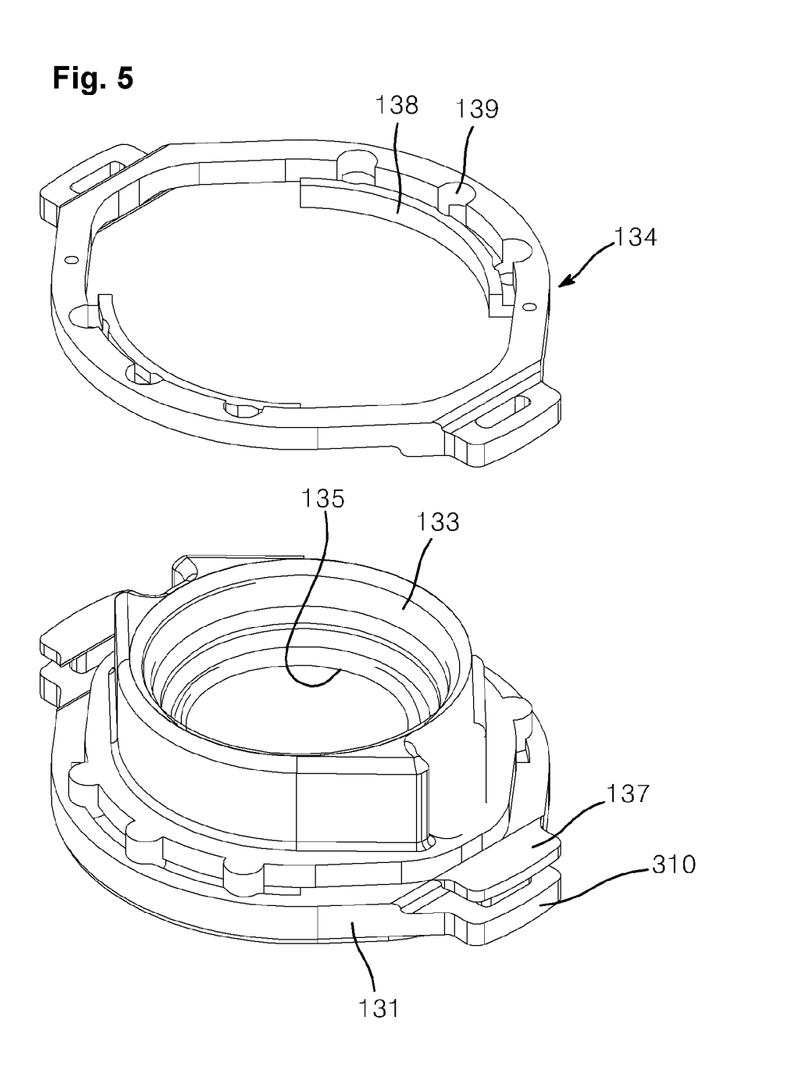
FIG. 5 is an exploded perspective view of a membrane and a membrane washer that constitute the gasket according to an embodiment of the present invention.
Figure 6:
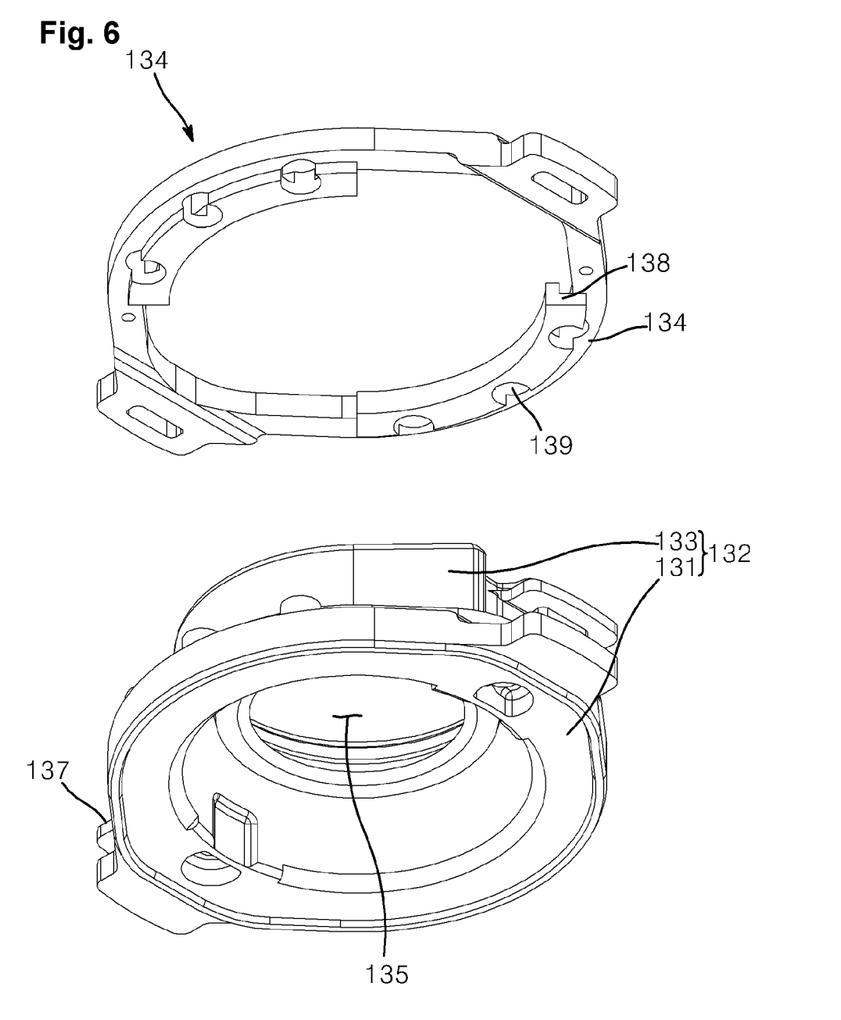
FIG. 6 is an exploded perspective view of the rear of the membrane and the membrane washer that constitute the gasket according to an embodiment of the present invention.
Figure 7:
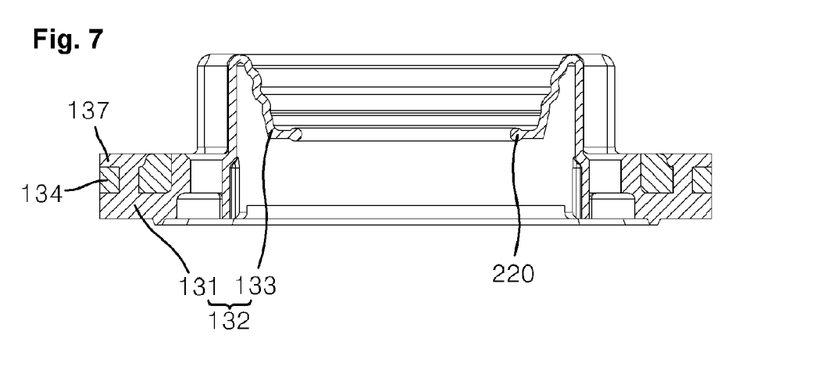
FIG. 7 is a cross-sectional view of the gasket according to an embodiment of the present invention.

FIG. 4 is an enlarged perspective view of a gasket according to an embodiment of the present invention, FIG. 5 is an exploded perspective view of a membrane and a membrane washer that constitute the gasket according to an embodiment of the present invention, FIG. 6 is an exploded perspective view of the rear of the membrane and the membrane washer that constitute the gasket according to an embodiment of the present invention, and FIG. 7 is a cross-sectional view of the gasket according to an embodiment of the present invention.

Figure 8:
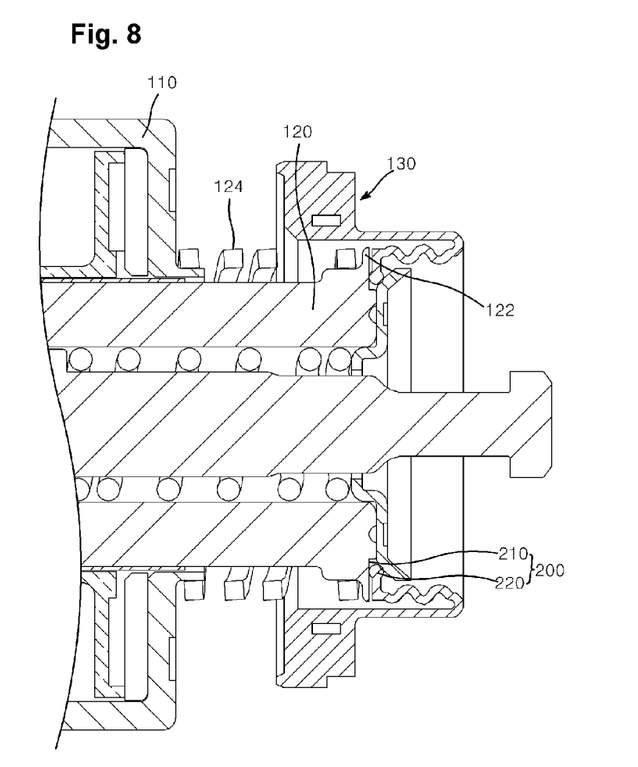
FIG. 8 is a cross-sectional view of a principal portion of the magnetic switch of the starter according to an embodiment of the present invention.

FIG. 8 is a cross-sectional view of a principal portion of the magnetic switch of the starter according to an embodiment of the present invention.

As illustrated in FIGS. 1 through 3, a magnetic switch 100 of a starter for starting a vehicle according to an embodiment of the present invention includes a case 110, a plunger 120, a gasket 130, a fixing unit 200, a front bracket 140, and a deformation prevention unit 300. The case 110 is coupled to the front bracket 140 using a coupling method utilizing a mechanical coupling element and includes a plunger 120 capable of reciprocating motions in an axial direction. Of course, the form of the case 110 may be changed to various other shapes. In particular, the front bracket 140 is coupled to the other side of the case 110. Thus, the other side of the case 110 is sealed by the front bracket 140.

As the plunger 120 is accommodated in the case 110 to make a rectilinear reciprocating motion, a gap into which foreign substances such as external moisture may be introduced is formed in a coupling portion of the case 110 and the front bracket 140 and between the case 110 and the plunger 120. Thus, the gap formed in the coupling portion of the case 110 and the front bracket 140 and the gap formed between the case 110 and the plunger 120 may be sealed. Thus, the gasket 130 is provided.

The gasket 130 is located at an inner portion of the front bracket 140 and provided on the other side of the case 110. Thus, the gasket 130 is used to seal the gap in the coupling portion of the case 110 and the front bracket 140 and the gap between the case 110 and the plunger 120. In this case, the gasket 130 may be formed of a rubber material to enhance a sealing ability. In particular, the gasket 130 has to be deformed when the plunger 120 makes reciprocation motions. In this case, the sealing ability of the gasket 130 may be deteriorated. Thus, the gasket 130 includes a membrane 132 and a membrane washer 134.

The membrane 132 is formed of a resin material having a sealing function and is formed of a soft material to be deformable to correspond to the plunger 120 that makes reciprocating motions. The membrane washer 134 is provided along an edge of the membrane 132 to prevent bending or deforming of the soft membrane 132. In particular, the membrane washer 134 is formed of a hard material. Also, the membrane 132 and the membrane washer 134 are insert injection molded to improve an assembly performance. In this case, the membrane washer 134 may be formed of a steel material or a hard resin material.

Meanwhile, the membrane 132 includes a rim member 131 and a bellows 133. The rim member 131 is supported in contact with the other side of the case 110. Also, the rim member 131 is provided to closely contact the case 110 in a direction of the other side of the case 110 by the front bracket 140 coupled to the other side of the case 110. Here, the rim member 131 is firmly coupled and fixed to the other side of the case 110 by bolting, etc. Furthermore, the rim member 131 is formed in the form of a ring including a circle, an oval, etc. Here, the rim member 131 includes the membrane washer 134 formed integrally therewith. That is, the membrane washer 134 is insert injection molded into the rim member 131.

The bellows 133 is provided inside of the rim member 131. Also, the bellows 133 forms an insertion hole 135 for inserting the plunger 120. In particular, the bellows 133 may be formed capable of contracting or expanding depending on a flow direction of air when the bellows 133 makes a rectilinear reciprocating motion together with the plunger 120 in the case 110. Thus, the bellows 133 is formed to be wrinkled. Of course, the bellows 133 may be formed in various shapes. Thus, the gasket 130 may be firmly assembled and enhance a waterproofing performance.

Meanwhile, when the membrane washer 134 is insert injected to be completely encompassed by the membrane 132, in particular, the rim member 131, the rim member 131 becomes thicker than the necessary. Thus, the membrane 132 may be formed so that the membrane washer 134 is exposed to one side. That is, the membrane washer 134 is insert injected into the rim member 131 to be exposed at one side of the rim member 131. Thus, the membrane washer 134 may arbitrarily escape from the membrane 132, i.e., the rim member 131. Thus, as illustrated in FIGS. 4 through 7, the membrane 132 forms support ribs 137 to prevent separation of the membrane washer 134 on one side. In other words, the rim member 131 forms the support ribs 137 when insert injection molding is performed to firmly confine the membrane washer 134. The support ribs 137 are formed discontinuously along an edge of the rim member 131 of the membrane 132 and thus surround the membrane washer 134.

In particular, as the support ribs 137 extend to one side of the rim member 131, grooves are formed by the rim member 131 and the support ribs 137. The membrane washer 134 is formed to be inserted into the grooves formed by the rim member 131 and the support ribs 137. The shape and the number of support ribs 137 are not limited. Here, preferably a minimum number of support ribs 137 may be formed. Of course, the support ribs 137 are naturally formed at the rim member 131 when insert injection molding is performed from a mold (not shown).

Also, the membrane washer 134 may preferably form bent ribs 138 to prevent being arbitrarily separated from the membrane 132. The bent ribs 138 are formed to extend bent inward or outward from the membrane washer 134. For convenience, the bent ribs 138 are formed to be bent inward from both sides of the membrane washer 134 facing each other. Thus, when the membrane washer 134 is insert injection molded into the rim member 131, the bent ribs 138 increase a cohesive force between the rim member 131 and the membrane washer 134. Of course, the bent ribs 138 may be formed in various shapes. In addition, the membrane washer 134 forms accommodation hole portions 139 that accommodate a part of the membrane 132 to prevent being arbitrarily separated from the membrane 132.

As a result, when the membrane washer 134 is insert injection molded into the rim member 131, the rim member 131 is formed with the accommodation hole portions 139 of the membrane washer 134 filled with an injection solution. Thus, the membrane washer 134 and the rim member 131 are firmly coupled to each other. Meanwhile, the gasket 130 may be fixed to the plunger 120 that makes a rectilinear reciprocating motion by being supported at the other side of the case 110 to be contracted and expanded. This is to maintain the gasket 130 in a sealed state. Thus, as illustrated in FIGS. 1 through 3 and FIG. 8, the fixing unit 200 is provided. The fixing unit 200 prevents the gasket 130 supported at the case 110 from escaping in an axial direction of the plunger 120.

Here, the fixing unit 200 includes a fit groove portion 210 and a fit protrusion 220. The fit groove portion 210 is dented on a perimeter surface of the plunger 120 in a circumferential direction.

The fit protrusion 220 is formed to protrude along the membrane 132, in particular, along inside of the bellows 133. That is, the fit protrusion 220 is formed to protrude along inside of the insertion hole 135. Thus, the fit protrusion 220 is inserted into the fit groove portion 210. The fit protrusion 220 may be formed in various shapes. As a result, the bellows 133 moves together with the plunger 120.

Furthermore, the plunger 120 may receive the force that enables the plunger 120 to be restored to its initial state after being inserted into the case 110. Thus, the plunger 120 forms a flange 122. A large elastic restoration force is applied to the plunger 120 by an elastic member 124 for restoration to an initial state. In this case, one side of the elastic member 124 is elastically supported at the other side of the case 110, and one other side of the elastic member 124 is elastically supported at the flange 122. A coil spring may be used as the elastic member 124. Also, after the gasket 130 having the soft bellows 133 is assembled with the plunger 120, the front bracket 140 is assembled with the case 110 while covering the gasket 130. In this case, when the front bracket 140 is incorrectly assembled, a deformation of the gasket 130 occurs. Due to this, a sealing ability is deteriorated. Thus, the deformation prevention unit 300 is provided to set an assembling position of the front bracket 140 and the gasket 130 to prevent a deformation of the gasket 130 due to the front bracket 140.

The deformation prevention unit 300 includes a position setting protrusion 310 and a position setting groove portion 320. The position setting protrusion 310 extends outward from the edge of the gasket 130. In this case, the position setting protrusion 310 may be formed to extend from the hard rim member 131 by insert injecting the membrane washer 134. Of course, the shape and the number of position setting protrusions 310 are not limited.

In addition, the position setting groove portion 320 is formed at the front bracket 140 to accommodate the position setting protrusion 310. In this case, the position setting groove portion 320 is formed so that there is a one-to-one correspondence between the position setting groove portion 320 and the position setting protrusion 310. While the position setting groove portion 320 accommodates the position setting protrusion 310, the front bracket 140 is assembled with the case 110 so that a deformation of the gasket 130 can be prevented.

Consequently, the gasket 130 may be easily assembled with the plunger 120 through an automatic facility (not shown), and an assembly performance can be enhanced. While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A gasket of a starter for starting an engine of a vehicle, the gasket comprising:
   a membrane which carries out a sealing function and is made of a resin material having flexibility; and
   a membrane washer provided along an edge of the membrane in order to prevent bending of the membrane, wherein the membrane is insert injected, is formed to expose the membrane washer at one side, and the membrane comprises:

a rim member supported at the membrane washer; and support ribs to be formed to cover a part of the exposed area of the membrane washer, wherein the membrane washer is formed to be inserted into grooves formed by the rim member and the support ribs, and comprises accommodation hole portions that accommodate a part of the membrane to prevent being separated from the membrane.

2. The gasket of claim 1, wherein the membrane comprises:

a bellows provided inside of the rim member and formed to be wrinkled.

3. The gasket of claim 1, wherein the support ribs prevent separation of the membrane washer at the one side.

4. The gasket of claim 1, wherein the membrane washer forms bent ribs to prevent being separated from the membrane.

\* \* \* \* \*